Figure 1:
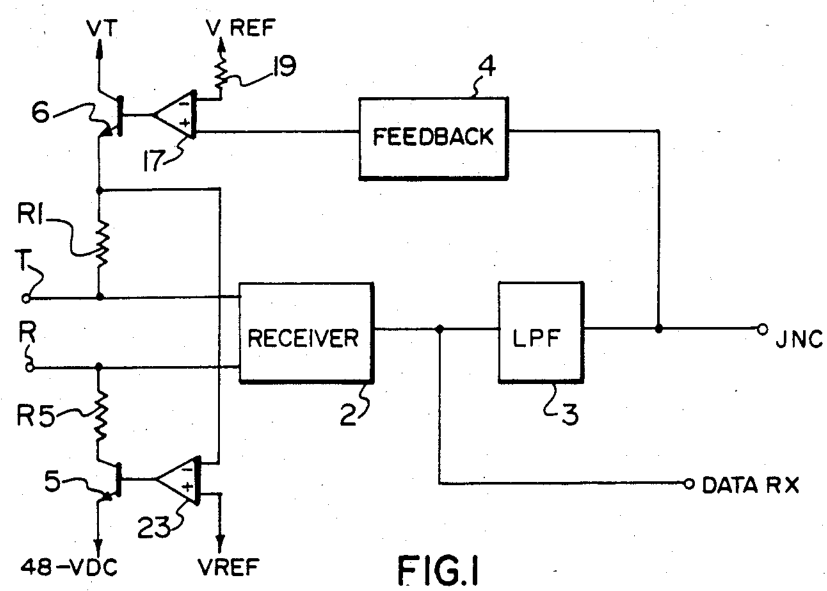

United States Patent [19]

Barsellotti

[11] Patent Number: 4,604,741

[45] Date of Patent: Aug. 5, 1986

[54] VOICE AND DATA INTERFACE CIRCUIT

[75] Inventor: John A. Barsellotti, Kanata, Canada

[73] Assignee: Mitel Corporation, Ontario, Canada

[21] Appl. No.: 611,515

[22] Filed: May 17, 1984

[30] Foreign Application Priority Data

Sep. 30, 1983 [CA] Canada ................................ 438,169

[51] Int. Cl.[4] .......................... H04J 1/12; H03H 7/38

[52] U.S. Cl. .................................. 370/69.1; 370/123; 179/16 F; 333/129; 333/32

[58] Field of Search ........................ 370/69.1, 76, 123; 340/825.39; 179/16 AA, 16 F, 170 D, 2 C, 2 DP, 170 NC; 375/12, 14; 178/69 M, 69 R; 333/129, 32, 17 R

[56] References Cited

U.S. PATENT DOCUMENTS

| | | | |
|---|---|---|---|
| 2,543,973 | 3/1951 | Jensen | 333/129 |
| 3,332,038 | 7/1967 | Stanley et al. | 333/129 |
| 4,095,198 | 6/1978 | Kirby | 333/32 |
| 4,187,493 | 2/1980 | Patterson | 333/32 |
| 4,273,963 | 6/1981 | Seidel | 179/16 F |

*Primary Examiner*—Robert L. Griffin
*Assistant Examiner*—Timothy K. Greer
*Attorney, Agent, or Firm*—Antonelli, Terry & Wands

[57] ABSTRACT

A circuit for receiving voice and data signals on a balanced line, the data signal being an amplitude modulated form of a carrier signal having a frequency at least twice as high as the highest frequency in the voice band. The circuit matches the input impedance thereof to a first nominal balanced line impedance with respect to voice signals and a second nominal balanced line impedance with respect to data signals, applies the data signals to an unbalanced data output terminal, and applies the voice signals to a terminal connected to a bidirectional unbalanced input/output lead of a PABX. The circuit also receives data signals from a terminal connected to an unbalanced data input lead from the PABX and voice signals from the terminal connected to the unbalanced bidirectional input/output lead, mixes the incoming data and voice signals and applies the mixed signals to the balanced line while preventing the mixed signals from being fed back to the unbalanced data output lead and the unbalanced bidirectional input/output lead. The circuit further provides a low resistance DC current path for applying sufficient operating battery to the balanced line for long subscriber loops. The carrier signal is substantially removed in frequency from the upper limit of the voice band, thus alleviating the requirement of multistage, sharp cut-off and critically adjusted filters. However, the carrier frequency is low enough so as not to be substantially radiated from the subscriber's line or be seriously deteriorated during transmission.

16 Claims, 2 Drawing Figures

VT
V REF
19
4
FEEDBACK
6
17
R1
T
R
RECEIVER
LPF
JNC
R5
2
3
5
DATA RX
23
48-VDC
VREF

VOICE AND DATA INTERFACE CIRCUIT

This invention relates to analog and digital communication systems and particularly to an interface circuit for coupling a balanced bidirectional communication line which carries analog and digital signals to an unbalanced bidirectional communication lead which carries analog signals, and to unbalanced unidirectional input and output communication leads which carry digital signals in a telephone system.

A subscriber's line which interfaces a telephone to a switching machine is formed of two leads (tip and ring). These two leads are used to carry all of the well known telephone signals: analog voice signals, ringing signals, state indication signals such as busy tone and dial tone, multi-frequency dialing tones or rotary dialing pulses, and direct current to power the telephone set. For multi-line systems which appear on a telephone set, such as a six button key set, the two leads are duplicated by the number of lines, and an additional pair of leads carries ringing signals. Clearly the bundle of leads or cables which connect this form of telephone set with the telephone switching equipment is costly, thick and difficult to manage and connect.

However, it was realized that since a telephone set can only be used for one telephone conversation at a time, only one pair of leads (a single telephone line) is required from a multi-line telephone set to carry the signals to the switching equipment.

Digital command signals can be used to cause the switching equipment to apply only one telephone signal to the telephone set at a time, or to enable operation of indicators, such as numerical displays at the telephone set. Consequently, in addition to carrying the well known signals noted earlier, it was realized that a digital transmission facility between the telephone set and switching machine is required. Thus, because of interference with, and between the signals (e.g. digital switching noise) more than two leads were deemed necessary in earlier prior art systems for transmitting voice, data and other signals between the switching machine and the telephone set.

In one prior art system, both digital data and voice signals were transmitted over the subscriber loop through the PABX switching crosspoints. However this required transmitting the data in a frequency band below 4 KHz. The two types of signals did not actually share the lines at the same time, since the voice signals would interfere with the data signals and the data signals would interfere with the voice signals, making both unintelligible during simultaneous transmission. Consequently the voice and data were separated by time, and there was no actual simultaneous use of the lines.

According to another prior art proposal, specialized modulation schemes were used, such as Walsh functions which attempted to encapsulate or otherwise separate the data signal from the voice signal. However such cases were generally unsuccessful since too many sideband signal components were generated either close to or within the voice band, causing interference with the voice band and making it difficult or impossible to secure the data with integrity.

There are many problems involved in transmitting digital data signals and voice signals at the same time on a bidirectional two wire lead pair. Sending the data signals at a high frequency results in radiation from the leads which is prohibited by Government regulatory bodies, since it causes interference with other apparatus and can cause interference between adjacant lead pairs. The characteristic of the lead pairs which creates losses, reflection signals, etc., also dictates transmission at the lowest possible frequency, to minimize such problems. Yet transmission of data signals at a low frequency results in interference with the voice band. Transmission at a frequency close to the voice band also results in substantially increased costs of the equipment. For example multi-stage, sharp cut off and critically adjusted filters, etc., are required. Further, frequency shift keyed data signals could not be switched noiselessly in prior art systems, thereby causing interference with the voice signal.

Since there is a great variation in the characteristics of the bidirectional lead pairs which comprise subscribers' lines, it is essential that the separation and recovery apparatus should be as simple and universally applicable as possible, yet should work reliably. The present invention is a voice and data interface circuit which can be used for simultaneous transmission of voice and data between a subscriber's set and a PABX.

The present invention is used in conjunction with a transmission system in which audio signals having frequencies within a predetermined voice band and data signals appear simultaneously on the balanced communication lead pair, and in which the data signals are modulated on a carrier signal which is of substantially higher frequency than the highest frequency in the voice band, Such a system is described in Canadian Patent application No. 396,694, applied for by Mitel Corporation and filed on Feb. 22nd, 1982.

If data signals are transmitted at a high bit rate, the radiation, interference, and signal deterioration problems described above with respect to the prior art, occur. The present invention receives data and voice signals from a remote source, such as a combined voice and data transmitter. The data signals are transmitted at a relatively low rate and are 100% modulated at the remote source, on a carrier signal which is substantially removed in frequency from the upper limit of the voice band, yet is low enough in frequency so as not to be substantially radiated from the subscriber's line or be seriously deteriorated during transmission.

A combined voice and data signal received from the tip and ring leads is applied to a first unbalanced lead and applied to a filter for passing the baseband voice and substantially attenuating the data signal, and applying the baseband voice to a second unbalanced lead.

Also, tip and ring leads have a first nominal line impedance with respect to voice signals that has been standardized in North America at typically 600 or 900 ohms. Tip and ring leads exhibit line impedances which are lower than the first line impedance with respect to signals of substantially higher frequency than the highest frequency in the voice band. For example, the tip and ring leads exhibit a nominal line impedance therebetween of typically 135 ohms with respect to a 32 KHz carrier signal. Therefore, a circuit for receiving both voice and frequency modulated data signals from tip and ring leads must exhibit input impedances which match the nominal tip and ring lead impedances at required predetermined frequencies.

The present invention exhibits the required matching input impedances through implementation of novel feedback circuitry which simultaneously aids in the separation or combining of the voice and data signals, discussed in detail below, and overcomes the cited disadvantages of prior art systems described above.

In general, the invention is an interface circuit comprising apparatus for receiving a first and a second signal having two different frequencies from a line which has a predetermined first nominal line impedance to the first signal and a predetermined second nominal line impedance to the second signal. The second nominal line impedance is less than the first nominal line impedance. The receiving apparatus has an input impedance intermediate the first and second line impedances. The invention further includes apparatus for applying the first signal in aiding phase therewith to the line, and for applying the second signal in opposing phase therewith to the line, whereby the input impedance is raised to at least approximately match the first nominal line impedance with respect to the first signal and lowered to at least approximately match the second nominal line impedance with respect to the second signal.

The invention is also a voice and data interface circuit comprising circuitry for receiving an analog signal and a digital signal from a bidirectional balanced line. The line has a first nominal line impedance with respect to the analog signal and a second nominal line impedance with respect to the digital signal. The first nominal line impedance is greater than the second nominal line impedance. The invention is further comprised of circuitry for transmitting at least the received digital signal to a first unbalanced line, and feed resistors for providing a low resistance path for DC current to the balanced line. The feed resistors provide an input impedance to the circuit which is lower than the first nominal line impedance and higher than the second nominal line impedance. The invention further includes circuitry for attenuating and inverting the received digital signal and for passing the received analog signal, and circuitry for transmitting the passed analog signal to a second unbalanced line having a third nominal line impedance, and feedback circuitry for applying the received analog signal in aiding phase and the attenuated and inverted digital signal in opposing phase respectively with the analog and digital signals on the balanced line through the feed resistors, whereby the input impedance is raised to approximately match the first nominal line impedance with respect to the analog signal and lowered to approximately match the second nominal line impedance with respect to the digital signal.

More particularly, the invention is a voice and data interface circuit comprising tip and ring terminals for connection to a bidirectional balanced lead pair having a first nominal line impedance with respect to a first analog signal having a predetermined bandwidth and a second nominal line impedance with respect to a carrier signal, the first nominal line impedance being greater than the second nominal line impedance, and feed resistors connected to the tip and ring terminals for providing a low resistance path for DC current to the balanced lead pair. The resistors provide an impedance across the tip and ring terminals which is lower than the first nominal line impedance and higher than the second nominal line impedance. The invention further includes circuitry for receiving the first analog signal and a first digital signal from the balanced lead pair, the digital signal being an amplitude modulated form of the carrier signal, and an unbalanced data output terminal connected to the receiving circuitry for transmission of at least the first digital signal to a PABX or central office. The invention also includes attenuator circuitry for passing the first received analog signal while inverting and substantially attenuating the first received digital signal, an unbalanced bidirectional terminal connected to the attenuator circuitry for transmitting the first passed analog signal to the PABX or central office and for receiving a second analog signal therefrom, an unbalanced data input terminal for receiving a second digital signal from the PABX or central office, circuitry connected to the feed resistors for combining and applying the second received analog and digital signals to the tip and ring terminals and cancelling circuitry connected to the combining circuitry for preventing the combined signals from being applied to the receiving circuitry. The invention also includes feedback circuitry for applying the first passed analog signal and the inverted and substantially attenuated first digital signal to the combining circuitry, the first passed signal having a first predetermined amplitude and the inverted and attenuated first digital signal having a second predetermined amplitude which is less than the first predetermined amplitude, and for applying the combined signal to the tip and ring terminals such that the first passed analog signal is applied in aiding phase and the inverted and attenuated first digital signal is applied in opposing phase to the first signals on the balanced lead pair whereby the impedance across the tip and ring terminals is raised to approximately match the first nominal line impedance with respect to the first analog signal and lowered to approximately match the second nominal line impedance with respect to the carrier signal.

The invention is also a method of interfacing voice and data signals in a circuit comprising receiving an analog and a digital signal from a bidirectional balanced lead pair having a first nominal line impedance with respect to the analog signal and a second nominal line impedance with respect to the digital signal, the first nominal line impedance being greater than the second nominal line impedance, and transmitting at least the digital signal to an unbalanced output lead. The method also includes feeding DC current to the balanced lead pair through a low valued resistance, the resistance provides an input impedance to the circuit which is lower than the first nominal line impedance and higher than the second nominal line impedance; attenuating the received digital signal; and applying the received analog signal to an unbalanced bidirectional lead. The method further includes feeding back the received analog signal in aiding phase with the analog signal on the balanced lead pair through the resistance such that the input impedance is raised to match the first nominal line impedance with respect to the analog signal, and feeding back the attenuated digital signal in opposing phase with the digital signal on the balanced lead pair through the resistance, such that the input impedance is lowered to match the second nominal line impedance with respect to the digital signal.

The invention is also a method of interfacing voice and data signals comprising the steps of providing a DC current path having a predetermined input impedance to a line, receiving a first and a second signal, having first and second frequencies respectively, from the line which has a predetermined first nominal line impedance to the first signal and a predetermined second nominal line impedance to the second signal. The second nominal line impedance is less than the first nominal line impedance, and the input impedance is intermediate the first and second line impedances. The method consists further of applying the first signal in aiding phase therewith to the line, and applying the second signal in opposing phase therewith to the line, whereby the input impedance is raised to at least approximately match the first nominal line impedance with respect to the first signal and lowered to at least approximately match the second nominal line impedance with respect to the second signal.

The present invention thus provides a facility for receiving voice and data signals on a balanced lead pair, amplifying the voice and data signals, whereby the amplification gain is greater for the data signals than for the voice signals, applying the data and voice signals to an unbalanced output terminal DATA RX, filtering the voice and data signals such that the data signal is substantially attenuated and phase inverted, and applying the voice signal to a JNC terminal connected to a bidirectional unbalanced input/output lead of the PABX. The present invention also provides circuitry for matching the input impedance for voice band signals to the nominal tip and ring line impedance with respect to voice signals, and matching the input impedance for data band signals to the characteristic tip and ring line impedance with respect to signals at the carrier signal frequency. The present invention also provides a low resistance DC current path for applying sufficient operating battery to long subscriber loops. In addition the present invention provides circuitry for receiving data signals on an unbalanced incoming data terminal DATA TX, and voice signals on the JNC terminal, mixing and amplifying the data and voice signals and applying the mixed signals to the balanced lead pair while preventing feedback of the mixed signals to the unbalanced outgoing data terminal DATA RX and the bidirectional unbalanced input/output lead connected to the JNC terminal.

Figure 2:
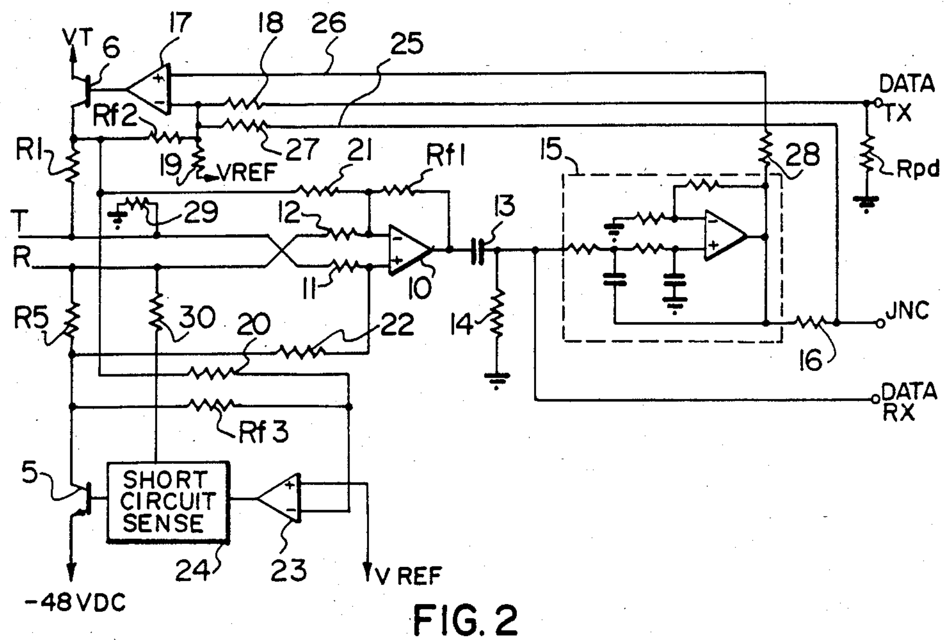

A better understanding of the invention will be obtained by reference to the detailed description below, in conjunction with the following drawings, in which FIG. 1 is a block schematic of the invention in its simplest form, FIG. 2 is a schematic diagram of a preferred embodiment of the invention.

Turning to FIG. 1, tip and ring terminals T and R, are connected to feed resistors R1 and R5 (which have similar values) for providing a low resistance DC current path to the tip and ring terminals from a source of power, −48 VDC. Tip and ring terminals T and R can be connected to bidirectional balanced tip and ring leads which form a subscriber's line.

The tip and ring terminals T and R, are also connected to a receiver 2 for receiving voice signals and data signals on the bidirectional balanced tip and ring leads. Receiver 2 has a predetermined input impedance, and hence a corresponding predetermined gain.

The voice signals have a predetermined defined bandwidth, typically 4 KHz., and the data signals are amplitude modulated forms of a carrier signal having a frequency of at least twice the highest frequency in the voiceband. The lowest significant sideband of the modulated carrier signal is thus higher than the upper limit of the defined bandwidth. In a successful prototype of the invention the carrier signal is a 100% amplitude modulated 32 KHz sine wave.

The output of receiver 2 is connected to a DATA RX terminal which can be connected to the unbalanced data receive lead of a PABX, and to the input of a low pass filter 3. An output of low pass filter 3 is connected to a JNC terminal which can be connected to a bidirectional unbalanced input/output lead which in a preferred embodiment of the invention is a junctor lead of the PABX.

The output of low pass filter 3 is also connected to feedback circuit 4 which applies signals received from receiver 2 and filtered by low pass filter 3 to feed resistor R1 through operational amplifier 17 and transistor 6, and in opposite phase to feed resistor R5 through transistor 5 and operational amplifer 23. The collector of transistor 6 is connected to a reference voltage VT. The noninverting input of operational amplifier 23 is connected to reference voltage VREF, and the inverting input of operational amplifier 17 is connected through resistor 19 to VREF.

Voice and data signals on the tip and ring terminals are received by and amplified in receiver 2 and are applied to the data receive terminal DATA RX and the low pass filter 3. Low pass filter 3 substantially attenuates, and performs a 180° phase shift on signals having a frequency greater than aproximately 8 KHz and passes signals having a frequency of less than approximately 8 KHz, without substantial attenuation or phase shift. The filtered signals are applied to feedback circuit 4, the output of which controls operational amplifier 17 which controls transistor 6.

The emitter of transistor 6 is connected to the inverting input of operational amplifier 23 through resistor 20. A rising signal voltage on the emitter of transistor 6 causes the signal voltage on the collector of transistor 5 to fall.

In operation, the received signals are filtered in low pass filter 3 as described above and are applied to the input/output terminal JNC and to feedback circuit 4. A predetermined portion of the voice signal is reapplied in aiding phase to the signal on tip and ring terminals T and R, through feed resistors R1 and R5 via transistors 6 and 5, and operational amplifers 17 and 23, respectively. Let this predetermined portion be denoted by 'a', where 'a' is greater than or equal to 0 and less than or equal to 1, and is dependent upon the predetermined gain of receiver 2.

A predetermined portion of the data signal is applied in opposing phase to the signals on the tip and ring terminals through feed resistors R1 and R5 (which have similar values) via transistors 6 and 5, and operational amplifiers 17 and 23, respectively. Let this predetermined portion be denoted by 'b', where 'b' is greater than or equal to 0 and less than or equal to 1, and is dependent upon the predetermined gain of receiver 2 and the attenuation in low pass filter 3.

The input impedance to voice signals, $Z_{INV}$, of the circuit measured between the tip and ring terminals is given by the voltage difference between the tip and ring terminals divided by the current flowing into the circuit. Since the voltage on the ring terminal is equal and opposite to the voltage on the tip terminal, the input impedance, $Z_{INV}$, of the circuit measured between the tip and ring terminals is given by twice the voltage on the tip terminal divided by the current flowing into the circuit.

An input amplifier of receiver 2 has a very high input resistance, and consequently most of the current flowing into the circuit passes through resistors R1 and R5.

Thus, for voice signals it can be shown that the circuit has an input impedance, $Z_{INV}$, of approximately $$Z_{INV} = \frac{2R_1}{1-a}, \text{ where } 0 \leqq a \leqq 1$$

The tip and ring leads typically have a first nominal line impedance with respect to voice signals of 600 or 900 ohms. The input impedance $Z_{INV}$, with respect to voice signals between tip and ring terminals can be made to match the first nominal line impedance by varying the portion 'a' of the voice signal fed back to the tip and ring terminals.

For instance, the input impedance $Z_{INV}$, can be theoretically as small as the resistance provided by feed resistors R1 and R5 (when a=0) or as great as infinity or open circuit (when a=1). Practical considerations, however, serve to restrict the actual range of realizable input impedances.

Data signals on the tip and ring terminals are amplified in receiver 2, substantially attenuated and inverted in low pass filter 3 and reapplied, in opposing phase to data signals on the tip and ring terminals, through feed resistors R1 and R5, respectively.

Thus, for data signals, it can be shown that the circuit has an input impedance $Z_{IND}$ approximately given by $$Z_{IND} = \frac{2R_1}{1+b}, \text{ where } 0 \leqq b \leqq 1$$

The balanced tip and ring leads have a second nominal line impedance with respect to carrier signals of approximately 135 ohms for a 32 KHz carrier signal. The resistance of the feed resistors R1 and R5 are typically greater than the second nominal line impedance but considerably less than the first nominal line impedance for voice signals. Thus, the input impedance, $Z_{IND}$, with respect to data signals can be made to match the second nominal line impedance by varying the portion 'b' of the phase inverted data signal fed back to the tip and ring terminals. This variation is accomplished by adjusting the amount of attenuation in low pass filter 3 in a well known manner.

The input impedance $Z_{IND}$, for data signals can be theoretically as great as the resistance provided by low value feed resistors R1 and R5 (when b=0) or as little as the resistance provided by one of low valued feed resistors R1 and R5 (when b=1).

Turning now to FIG. 2, a schematic representation of a preferred embodiment of the voice and data interface circuit, voice and data signals carried by the balanced tip and ring leads are received by tip and ring terminals T and R, and pass through high valued input resistors 11 and 12 to non-inverting and inverting inputs respectively of operational amplifier 10. An output signal from operational amplifier 10 is AC coupled via capacitor 13 to the DATA RX terminal and to ground via bypass resistor 14. Capacitor 13 and resistor 14 form a high pass filter for removing noise and AC power line signals below approximately 200 Hz. The output of amplifier 10 is connected to the inverting input thereof through feedback resistor, Rf1, in a well known manner.

The filtered signals are then applied to a Sallen and Key low pass filter 15 which substantially attenuates and performs a 180° phase shift on signals above approximately 8 KHz. Thus, the modulated data signals and corresponding sidebands are attenuated and phase shifted, while voice signals are passed substantially without attenuation or phase shifting. The low pass filtered signals are carried through a junctor impedance matching resistor 16 to the unbalanced input/output terminal JNC. This terminal can be connected to the junctor lead of a switching system such as a PABX.

The voice and data signals at the output of capacitor 13 also appear on the DATA RX terminal, for transmission to a data bus or other microprocessor circuitry in the PABX.

Outwardly destined data signals from the PABX modulated on a 32 KHz carrier signal are received from an unbalanced input lead connected to the PABX through input terminal DATA TX, which is connected to ground through pulldown resistor $R_p$d, and are applied to an inverting input of operational amplifier 17 via a high valued input resistor 18. The output signal from operational amplifier 17 is applied via power transistor 6 to the tip (or ring) lead via feed resistor R1, as described above with reference to FIG. 1.

The junction of the emitter of transistor 6 and resistor R1 is connected to the inverting input of amplifier 10 via a high valued resistor 21 and to the inverting input of amplifier 17 through feedback resistor Rf2, in a well known manner.

The inverting input of operational amplifier 17 is connected to a reference voltage VREF through resistor 19.

The non-inverting input of operational amplifier 10 is connected to the ring terminal R through corresponding high valued resistor 22 and feed resistor R5. The junction of resistors R5 and 22 is connected to the collector of a power transistor 5, the emitter of which is connected to a source of −48 volt DC operating battery for the tip and ring terminals. The junction of resistors R1 and Rf2 is further connected through input resistor 20 to the inverting input of operational amplifier 23, a noninverting input of which is connected to the source of reference voltage VREF. In a successful prototype of the invention VREF was −10 volts. The output of operational amplifier 23 is connected to the base of transistor 5 through short circuit sensor 24. The collector of transistor 5 is connected to the inverting input of operational amplifier 23 through feedback resistor Rf3. The tip terminal is connected to ground through high valued resistor 29, and the ring terminal is connected to short circuit sensor 24 through like valued resistor 30.

Short circuit sensor 24 senses the current flowing in resistor 30, and inhibits operation of the transistor 5 from applying line current if the current therein is above a predetermined threshold (e.g. greater than 100 milliamperes).

Feedback, as described above with reference to element 4 of FIG. 1, is provided by a pair of leads 25 and 26. Lead 25 is connected to the JNC terminal, and in a circuit to the inverting input of amplifier 17 through a resistor 27. Resistors 27 and 18 are of approximately equal value.

Lead 26 is connected to the output of the Sallen and Key filter 15 and in a circuit to the non-inverting input of operational amplifier 17 through corresponding resistor 28 which has approximately the same value of resistance as either of resistors 27 or 18.

Data signals received from the PABX on the DATA TX terminal are amplified in amplifiers 17 and 23, power amplified in transistors 6 and 5, and applied to the tip and ring terminals through low valued feed resistors R1 and R5. Because the signals are re-applied to the non-inverting and inverting inputs of amplifier 10 through resistors 11 and 12 respectively, they are also applied in like phase via resistors 21 and 22 to the inverting and non-inverting inputs respectively of amplifier 10. As a result, the data signals to be transmitted from the PABX to the tip and ring leads are thus substantially cancelled in amplifier 10. However, signals received from the tip and ring leads are differentially received and amplified in amplifier 10.

Feed resistors R1 and R5 are typically 75 ohms each. The DC input impedance of the interface circuit is therefore 150 ohms. Input resistors 11 and 12 are approximately 200k ohms each.

The junction of resistor R1 and the emitter of transistor 6, and the junction of resistor R5 and the emitter of transistor 5 are denoted as feed points. A portion of the voice band signals on the tip and ring leads also appears on the feed points as a result of the aforementioned feedback. The instantaneous voltage on the feed points, due to voice signals, effectively tracks the signal voltage on the tip and ring leads. Therefor, less current flows through resistors R1 and R5 when signal feedback is applied thus raising the apparent input impedance to voice signals to approximately 600 ohms.

In operation, voice and data signals appearing on the tip and ring terminals are differentially amplified in amplifier 10, pass through a high pass filter comprised of capacitor 13 and resistor 14, and are applied to the DATA RX terminal and Sallen and Key low pass filter 15. Filter 15 passes the voice signals while substantially attenuating and performing a phase inversion on the data signals.

The amplitude of the voice signal appearing on the JNC input/output terminal is attenuated by a factor of 2 with respect to the signal appearing at the output of filter 15 as a result of the voltage drop across resistor 16. The voice signal and the attenuated data signal are applied to the non-inverting and inverting inputs of operational amplifier 17 respectively through like valued resistors 28 an 27.

The amplitude of the voice signal appearing on the non-inverting input of operational amplifier 17 is twice the amplitude of the signal appearing on the inverting input. The voice signal is thus amplified in amplifier 17. The voice signal output of amplifier 17 controls the base-emitter voltage of transistor 6. The voice signal is thus further amplified in transistor 6 and applied in aiding phase to the signal on the tip terminal through R1. The signal is also applied to the inverting input of operational amplifier 23, through resistor 20. The signal is thus further amplified and phase shifted by 180°. The inverted signal is applied to the base of transistor 5, amplified therein and applied in aiding phase to the signal on the ring terminal through R5.

Substantially attenuated data signals appearing at the output of low pass filter 15 are fed back to the feed points in the same manner as described herein above for voice signals. However, the data signals are negatively fed back due to phase inversion in low pass filter 15. Therefore, an increase in the instantaneous voltage of the data signal between the tip and ring lines causes a decrease in the instantaneous voltage at the feed points, more current flows through resistors R1 and R5 and the apparent tip to ring impedance is lowered with respect to the DC line impedance.

The balanced tip to ring line impedance at 32 KHz is typically 135 ohms.

In addition to lowering the input impedance, negative feedback provides gain adjustment for amplifier 10 by providing a feedback signal at the feed points which is subtracted from the signal on the tip and ring line. This has the net effect of increasing gain through amplifier 10 at the carrier frequency (i.e. greater than 8 KHz), and as a result reduces the amount of attenuation in the data band path.

In a successful prototype of the invention, amplifier 10 provided a 20 db/octave attenuation of voice signals due to positive feedback, and a 12 db/octave attenuation of data signals due to negative feedback. Therefore, the data to voice signal ratio at the output of amplifier 10 was improved by 8 db for transmission to the unbalanced data output terminal, DATA RX.

It is possible to adjust the amount by which the input impedance is raised or lowered due to positive or negative feedback respectively by mixing signals at the input to low pass filter 15 with signals at the output of filter 15. By varying the relative proportions of the mixed feedback signals, different apparent input impedances can be realized.

In summary, for a successfully implemented prototype of the invention, a low resistance DC input impedance of 150 ohms was provided by two 75 ohm resistors R1 and R5 which allowed for high current supply to long subscriber loops. A voice band input impedance of 600 ohms was provided for matching the nominal voice line impedance through the use of positive feedback. A data band input impedance of 135 ohms was provided by a negative feedback path for matching the natural impedance characteristic of the balanced line at 32 KHz.

Protection from common mode signals is also provided by resistors R1, R5, 11 and 12. High common mode currents are effectively blocked by high valued balancing resistors 11 and 12 and shunted to ground through low value resistors R1 and R5, thus effectively isolating the inputs of amplifier 10 from excessive common mode voltages.

Outgoing data signals on the unbalanced DATA TX terminal and outgoing voice signals from the JNC terminal are mixed and amplified in amplifier 17 and applied to the tip and ring terminals through resistors R1 and R5 for transmission to the balanced lead pair. In order to prevent signals from being reapplied to the JNC and DATA RX terminals, the mixed outgoing signals are also applied via resistor 21 to the inverting input of amplifier 10 and via resistor 22 to the non-inverting input of amplifier 10, the resistances of resistors 21 and 22 being approximately equal to the sum of the resistances of resistors 20 and R1 or R5 and 12. The signals to be transmitted to the tip and ring terminals appear as common mode signals on the inputs of amplifier 10 and are thus substantially cancelled as described above. However, incoming signals from the tip and ring leads are differentially received and amplified in amplifier 10.

A person skilled in the art understanding this invention may now conceive of other embodiments, variations, or designs using the principles of this invention. All are considered to be within the sphere and scope of the invention as defined in the claims appended hereto.

I claim:

1. An interface circuit comprising:

(a) means for receiving a first and a second signal having two different frequencies from a line, the line having a first nominal line impedance to the first signal and a second nominal line impedance to the second signal which is less than the first nominal line impedance, said receiving means having an input impedance intermediate said first and second line impedances, and (b) means for applying a representation of the first signal in aiding phase with the first signal and a representation of the second signal in opposing phase to the second signal, to the line whereby the input impedance is raised to at least approximately match the first nominal line impedance with respect to the first signal and lowered to at least approximately match the second nominal line impedance with respect to the second signal.

2. A voice and data interface circuit comprising:

(a) means for receiving an analog signal and a digital signal from a bidirectional balanced line, said line having a first nominal line impedance with respect to the analog signal and a second nominal line impedance with respect to the digital signal, the first nominal line impedance being greater than the second nominal line impedance, (b) first transmitting means connected to said receiving means for transmitting at least the digital signal to a first unbalanced line, (c) means for applying DC line current to said balanced line comprising feed resistor means for providing a low resistance path for said DC current to said balanced line, said resistor means providing an input impedance to said circuit which is lower than the first nominal line impedance and higher than the second nominal line impedance, (d) attenuator means connected to said receiving means and the first transmitting means for attenuating and inverting said received digital signal and for passing said received analog signal, (e) second transmitting means connected to the attenuator means for transmitting said passed analog signal to a second bidirectional unbalanced line having a third nominal line impedance, and (f) feedback means connected to the attenuator means for applying said received analog signal in aiding phase and said attenuated and inverted digital signal in opposing phase respectively to said analog and digital signals on said balanced line through said resistor means, whereby the input impedance is raised to approximately match the first nominal line impedance with respect to the analog signal and lowered to approximately match the second nominal line impedance with respect to the digital signal.

3. A voice and data interface circuit as defined in claim 2, wherein the means for receiving further includes means for amplifying said digital and analog signals.

4. A voice and data interface circuit as defined in claim 2, wherein the attenuator means further includes a low-pass filter for substantially attenuating and inverting the digital signal and for passing the analog signal, and the second transmitting means further includes an impedance matching resistor connected between said unbalanced bidirectional line and the low pass filter for matching the third nominal line impedance.

5. A voice and data interface circuit as defined in claim 3 or 4, wherein the means for amplifying is a differential amplifier having a first gain fon the analog signal and a second gain for the digital signal, the first gain being less than the second gain.

6. A voice and data interface circuit as defined in claim 3 or 4, wherein the feedback means is adapted to adjust the gain of said amplifying means whereby said raised input impedance with respect to the analog signal decreases the gain of said amplifying means with respect to the analog signal, and said lowered input impedance with respect to the digital signal increases the gain of said amplifying means with respect to the digital signal.

7. A voice and data interface circuit comprising:

(a) tip and ring terminals for connection to a bidirectional balanced lead pair having a first nominal line impedance with respect to a first analog signal having a predetermined bandwidth and a second nominal line impedance with respect to a carrier signal, the first nominal line impedance being greater than the second nominal line impedance, the carrier signal having a substantially higher frequency than the highest frequency in said bandwidth, (b) feed resistor means connected to the tip and ring terminals for providing a low resistance path for DC line current to said balanced lead pair, said resistor means impressing an impedance across the tip and ring terminals which is lower than the first nominal line impedance and higher than the second nominal line impedance, (c) receiving means connected to the tip and ring terminals for receiving the first analog signal and a first digital signal from said balanced lead pair, said digital signal being an amplitude modulated form of the carrier signal, (d) a data output terminal connected to the receiving means for transmission of at least the first digital signal to an unbalanced data output lead connected to a PABX or central office, (e) attenuator means connected to the receiving means for passing said first received analog signal while inverting and substantially attenuating said first received digital signal, (f) a junctor terminal connected to the attenuator means for transmitting said first passed analog signal to an unbalanced bidirectional lead connected to the PABX or central office, and for receiving a second analog signal therefrom, (g) a data input terminal connected to the attenuator means for receiving a second digital signal from an unbalanced data input lead connected to the PABX or central office, (h) feedback means for applying said first passed analog signal and said inverted and substantially attenuated first digital signal to a combining means, said combining means having an output of combined signals, said first passed signal having a first predetermined amplitude and said inverted and attenuated first digital signal having a second predetermined amplitude which is less than the first predetermined amplitude, and for applying said combined signal to the tip and ring terminals such that said first passed analog signal is applied in aiding phase and said attenuated first digital signal is applied in opposing phase to said first signals on said balanced lead pair, whereby the impedance across the tip and ring terminals is raised to approximately match the first nominal line impedance with respect to the first analog signal and lowered to approximately match the second nominal line impedance with respect to the carrier signal, (i) said combining means being connected to said unbalanced bidirectional and data input terminals for combining and applying said second received analog and digital signals to the tip and ring terminals through the feed resistor means, and (j) cancelling means connected to the combining means for preventing said combined signals from being applied to the means for receiving.

8. A voice and data interface circuit as defined in claim 7, wherein the means for receiving includes means for amplifying said digital and analog signals, said tip and ring terminals being connected to first and second inputs of said amplifying means through high valued balancing input resistors of approximately equal resistance.

9. A voice and data interface circuit as defined in claim 7, wherein said means for combining and applying is a summing amplifier means, the output of which is connected to the feed resistor means, and a first input of which is connected to an output of the attenuator means, and a second input of which is connected in a circuit to the junctor terminal and to the data input terminal.

10. A voice and data interface circuit as defined in claim 8 or 9, wherein the means for amplifying is a differential amplifier having a first gain for the first analog signal and a second gain for the first digital signal, the first gain being less than the second gain.

11. A voice and data interface circuit as defined in claim 8 or 9, wherein the feedback means is adapted to adjust the gain of said amplifying means whereby said raised impedance across the tip and ring terminals for the first analog signal decreases the gain of said amplifying means with respect to the first analog signal, and said lowered impedance across the tip and ring terminals for the first digital signal increases the gain of said amplifying means with respect to the first digital signal.

12. A voice and data interface circuit as defined in claim 8 or 9, wherein the cancelling means is a circuit path from the output of the summing amplifier means to one of the first and second inputs of said amplifying means through a third resistance having the same value of resistance as either of said balancing input resistors, the other input being connected to the output of the summing amplifier means through the feed resistor means, whereby signals appearing at the output of the summing amplifier means are cancelled in said amplifying means.

13. A voice and data interface circuit as defined in claims 7, 8 or 9 wherein said analog signals are audio signals, said carrier signal frequency is approximately 32 KHz, said carrier signal is preferably 100% amplitude modulated, and said low passfilter has a cut-off frequency of approximately 8 KHz.

14. A method of interfacing voice and data signals in a circuit comprising:

(a) receiving an analog and a digital signal from a bidirectional balanced lead pair having a first nominal line impedance with respect to the analog signal and a second nominal line impedance with respect to the digital signal, the first nominal line impedance being greater than the second nominal line impedance, (b) transmitting at least the digital signal to an unbalanced output lead, (c) feeding DC current to said balanced lead pair through low valued resistance means, said resistance means providing an input impedance to the circuit which is lower than the first nominal line impedance and higher than the second nominal line impedance, (d) applying said received analog signal to an unbalanced bidirectional lead, (e) feeding back said received analog signal in aiding phase with said analog signal on the bidirectional balanced lead pair through said resistance means, (f) attenuating said received digital signal, and (g) feeding back said attenuated digital signal in opposing phase with the digital signal on the bidirectional balanced lead pair through said resistance means, whereby the input impedance is lowered to match the second nominal line impedance with respect to said digital signal, and raised to match the first nominal line impedance with respect to said analog signal.

15. A method of interfacing voice and data signals in a circuit comprising:

(a) receiving a first and a second signal having first and second frequencies respectively, from a line which has a predetermined first nominal line impedance to the first signal and a predetermined second nominal line impedance to the second signal, the second nominal line impedance being less than the first nominal line impedance, said circuit having a nominal input impedance intermediate the first and second line impedances, (c) reapplying a representation of the first signal in aiding phase with the first signal to the line, and (d) reapplying a representation of the second signal in opposing phase to the second signal to the line, whereby the input impedance is raised to at least approximately match the first nominal line impedance with respect to the first signal and lowered to at least approximately match the second nominal line impedance with respect to the second signal.

16. A method as defined in claim 15, in which the nominal input impedance is substantially defined by providing a DC current path having said input impedance to said line.

* * * * *